Feb. 4, 1964            K. MULLER           3,120,339
CYCLE FOR A WIDE SPEED AND LOAD RANGE
Filed May 7, 1962                                    8 Sheets-Sheet 4
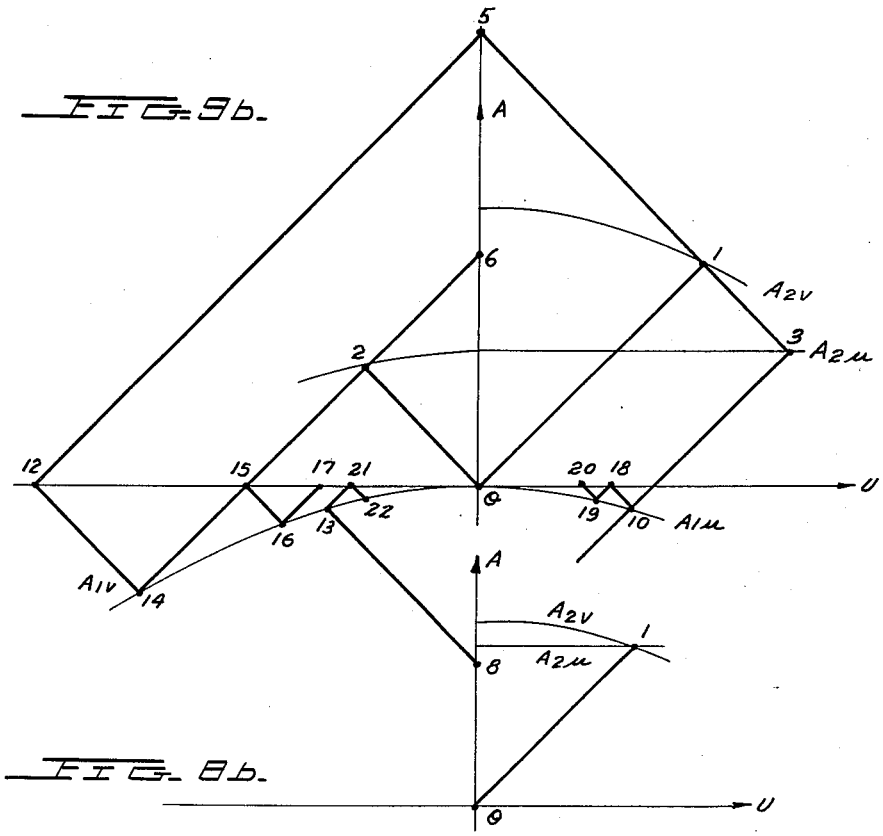
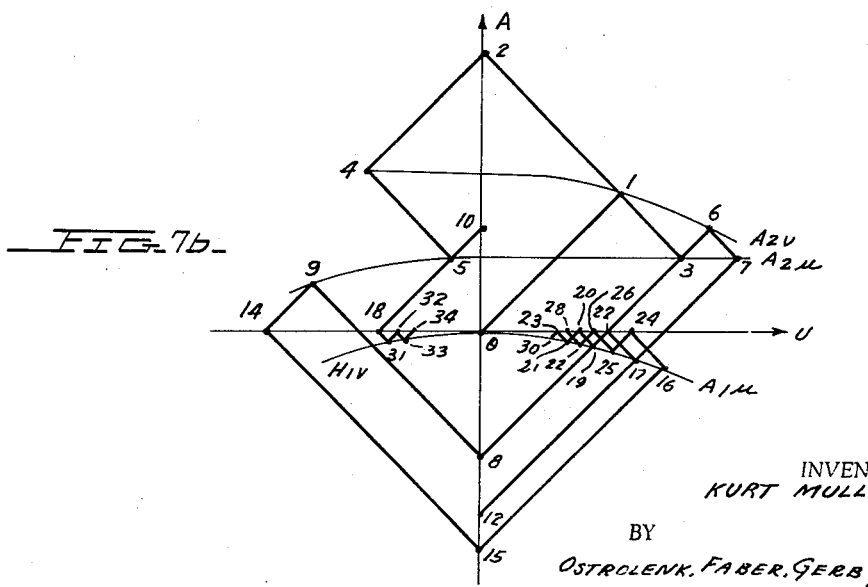
INVENTOR.
KURT MULLER
BY
OSTROLENK, FABER, GERB & SOFFEN
ATTORNEYS

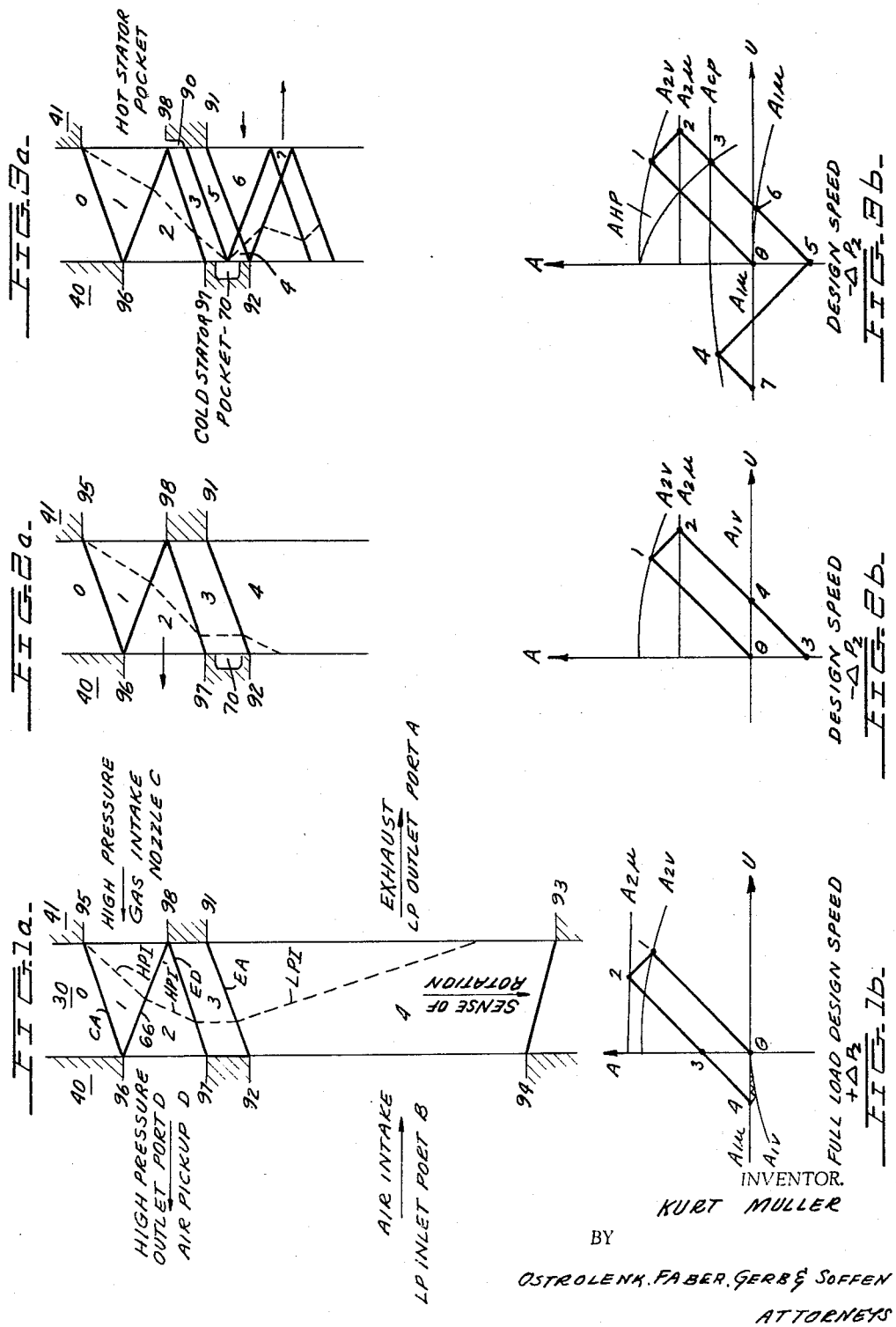

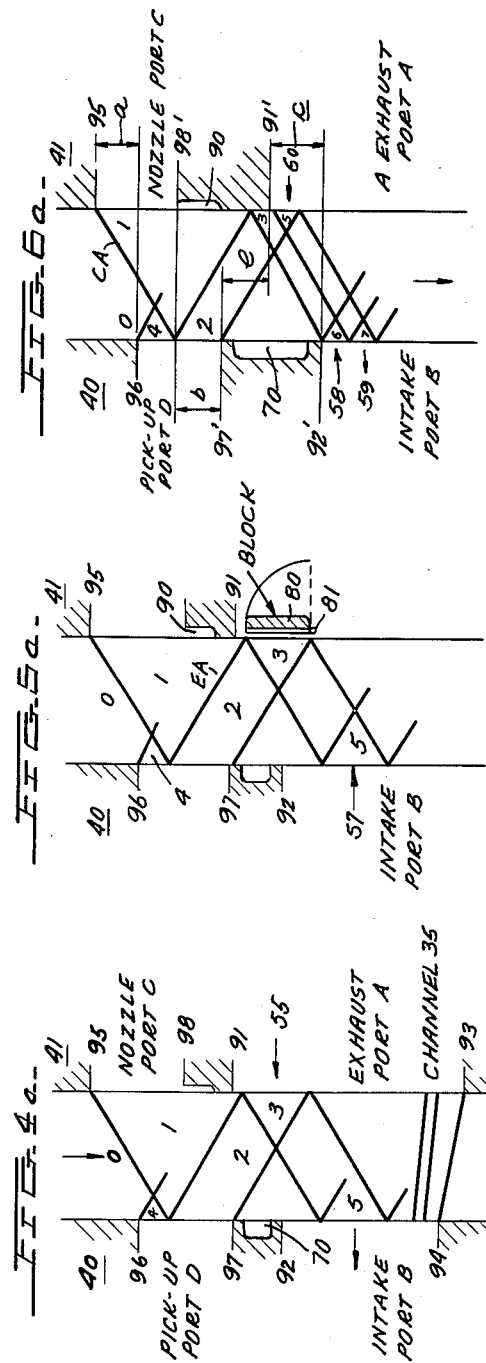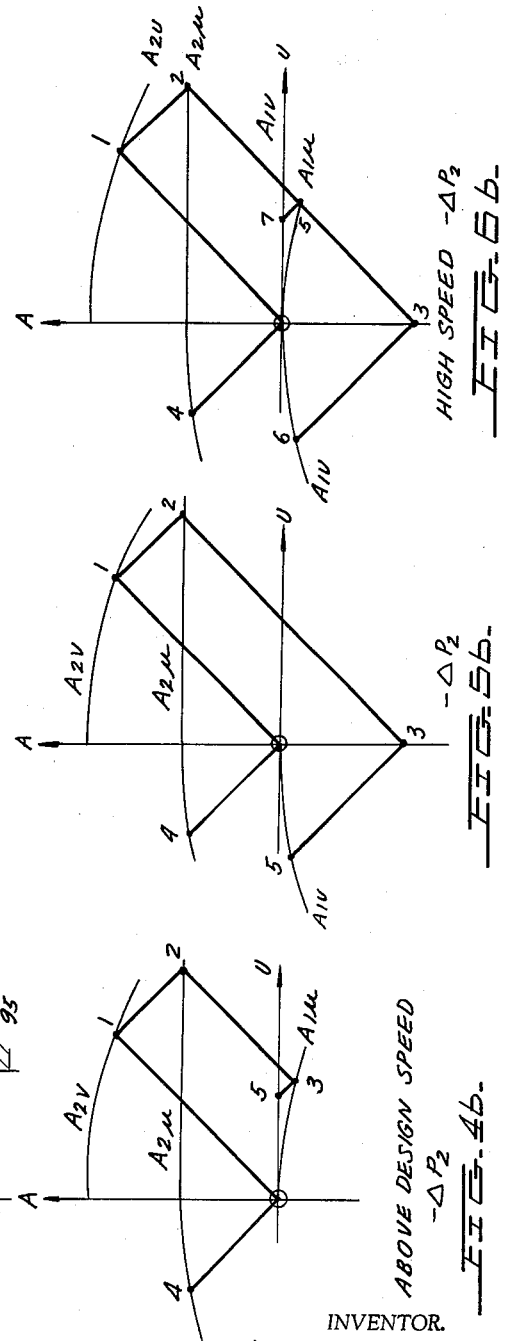

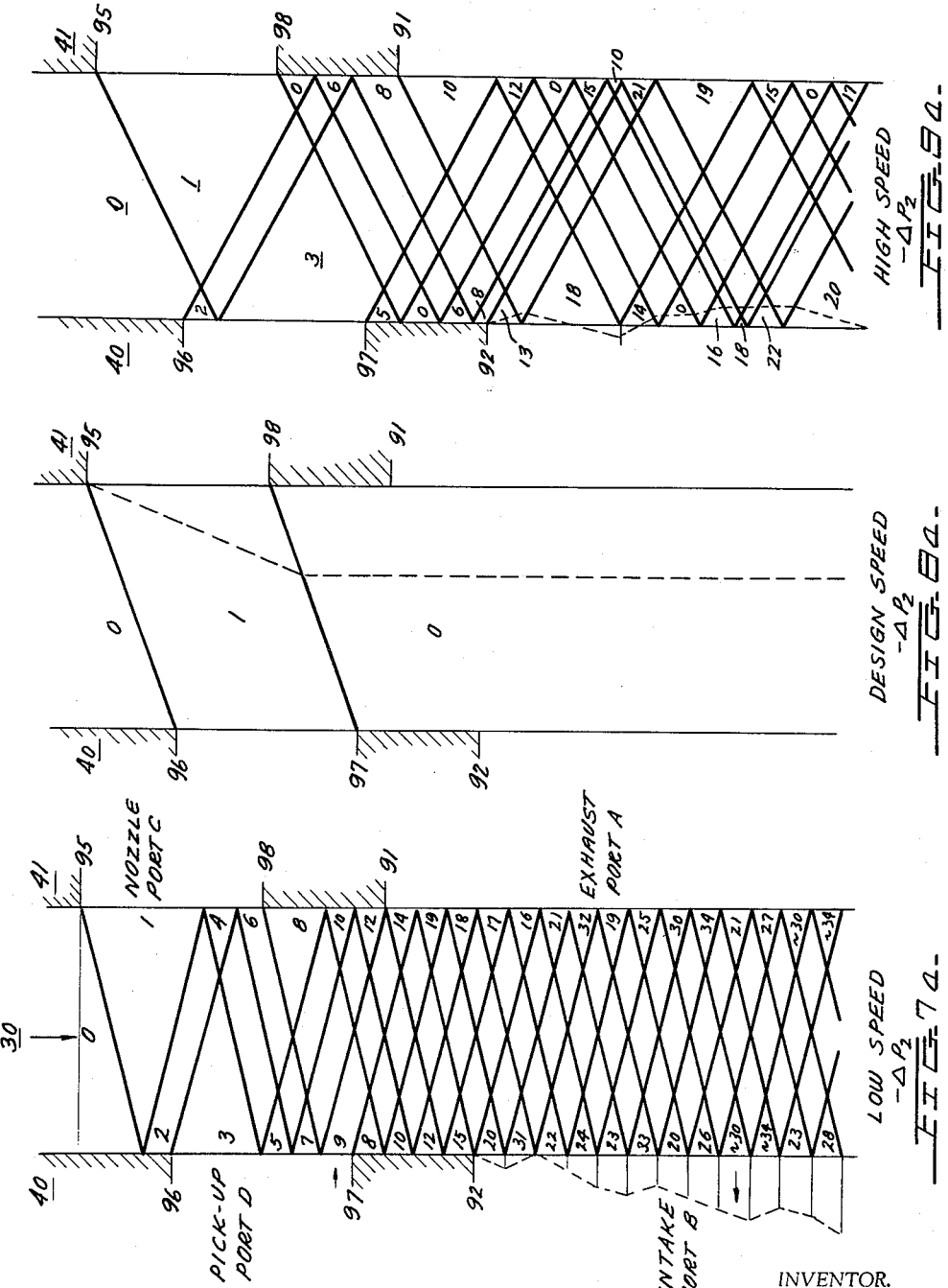

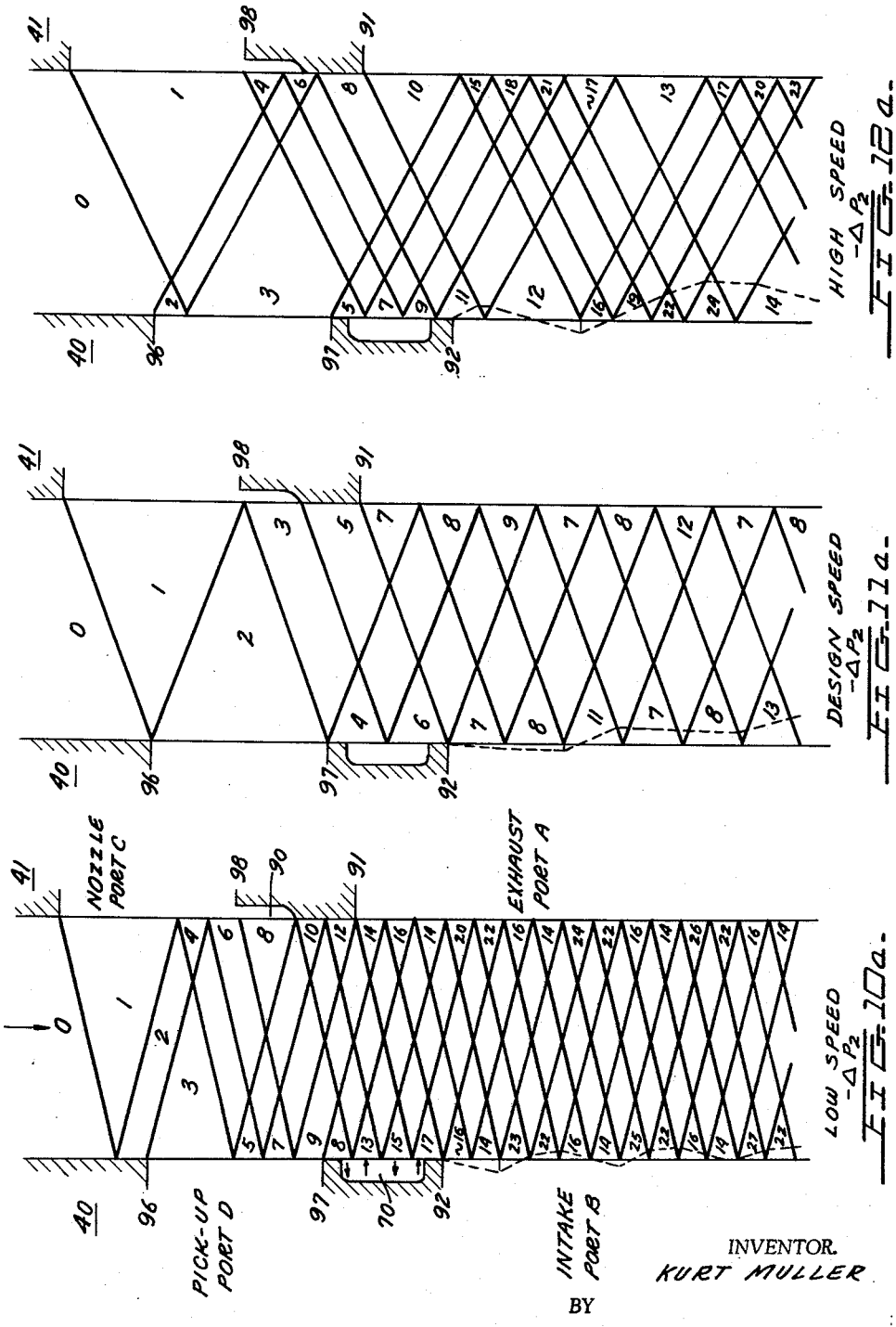

Feb. 4, 1964 K. MULLER 3,120,339
CYCLE FOR A WIDE SPEED AND LOAD RANGE
Filed May 7, 1962 8 Sheets-Sheet 6

INVENTOR.
KURT MULLER
BY
OSTROLENK, FABER, GERB & SOFFEN
ATTORNEYS

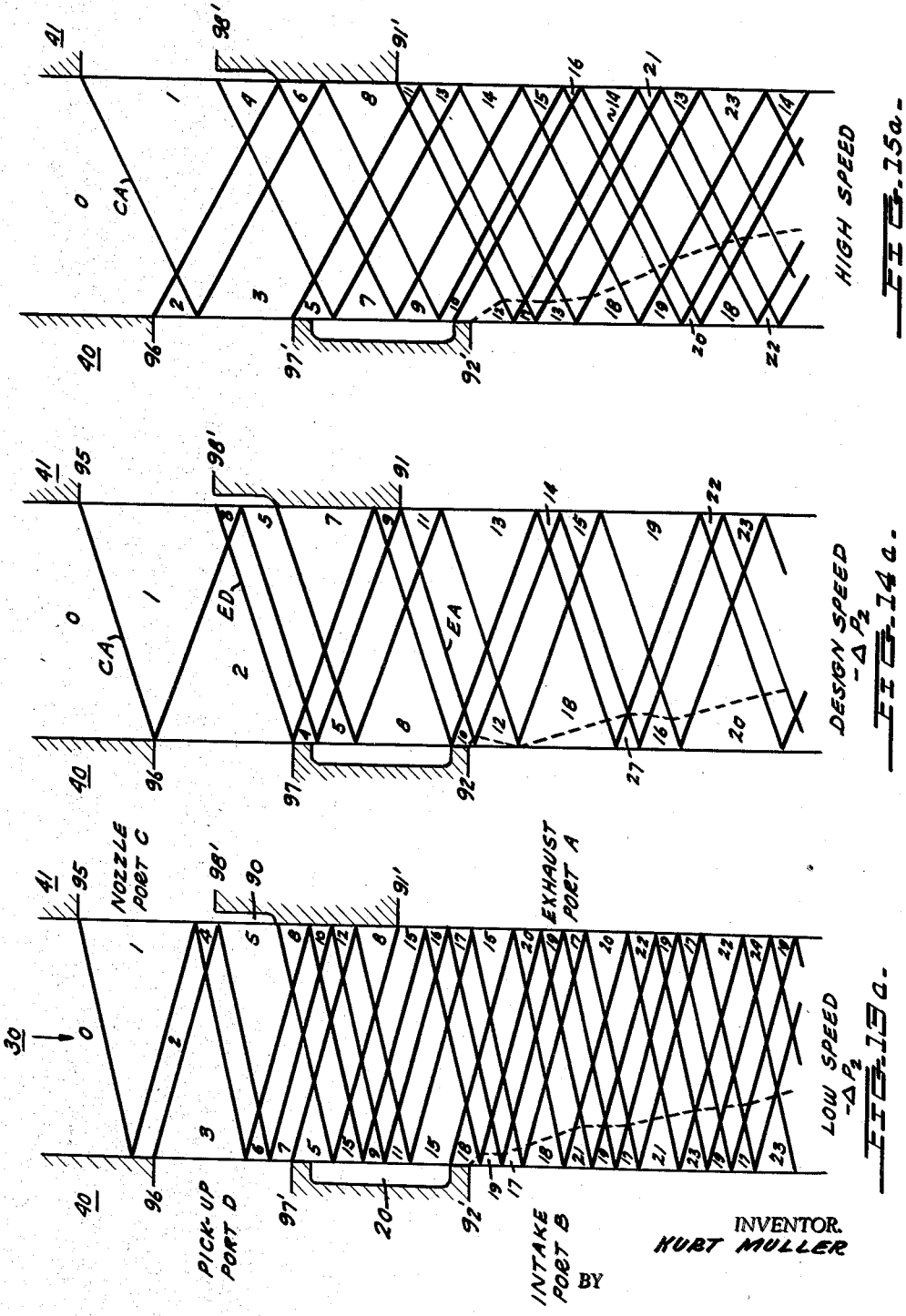

INVENTOR.
KURT MULLER
BY
OSTROLENK, FABER, GERB & SOFFEN
ATTORNEYS

3,120,339
CYCLE FOR A WIDE SPEED AND LOAD RANGE

Kurt Muller, Philadelphia, Pa., assignor to I-T-E Circuit Breaker Company, Philadelphia, Pa., a corporation of Pennsylvania
Filed May 7, 1962, Ser. No. 192,829
8 Claims. (Cl. 230—69)

My invention relates to pressure exchangers and, more particularly, is directed to a novel construction for pressure exchangers which are driven by the unit being supercharged by the pressure exchanger.

Pressure exchangers are well known in the art and the general arrangement to which my invention is directed is illustrated in several prior art patents, such as: U.S. Patent 2,853,987 issued September 30, 1958, to M. Berchtold et al., entitled "Diesel Engine Supercharging by the Aero-Dynamic Wave Machine"; U.S. Patent 2,867,981 issued January 13, 1959, to M. Berchtold, entitled "Aero-Dynamic Wave Machine Functioning as a Compressor and Turbine"; U.S. Patent 2,957,304 issued October 25, 1960, to M. Berchtold, entitled "Aero-Dynamic Wave Machine Used as a Supercharger for Reciprocating Engines"; U.S. Patent 2,959,344 issued November 8, 1960, to E. Niederman, entitled "Reverse Cycle Aero-Dynamic Wave Machine"; and U.S. Patent 2,970,745 issued February 7, 1961, to M. Berchtold, entitled "Wave Machine." All of the aforementioned patents are assigned to the I-T-E Circuit Breaker Company.

In the construction of pressure exchangers, also known as aero-dynamic wave machines, it is not always possible to have the rotor of the machine rotating at the r.p.m. necessary for optimum results. That is, in the event it is desirable to use the pressure exchanger as a supercharger, and to have the pressure exchanger indirectly or directly belt-driven from the reciprocating engine being supercharged, then there will be a variation in the speed of the rotor of the pressure exchanger.

Unfortunately, the mis-timing of the waves within the machine are detrimental to scavenging as the rotor speed is reduced and especially at low pressure. Furthermore, there will be an undesirable back-flow from the pick-up or high pressure outlet port as a result of the mis-timing of the waves created by the slowing down of the rotor, as well as the speed-up of the rotor above design speed.

One embodiment for compensating the mis-timing of the waves as a result of low speed of the rotor is set forth in copending U.S. application Serial No. 133,104 filed August 22, 1961, in the names of Waleffe, Jenny and Muller, entitled "Pocket Combination for Extension for Speed and Load Range of AWM Supercharger" and assigned to Brown, Boveri and Co., Ltd. However, in the embodiment shown in aforementioned copending U.S. application Serial No. 133,104, although it represents an improvement over the prior art, it does not make the necessary compensation for rotor speeds above design speeds. Therefore, the instant application is specifically directed to an improvement of the aforesaid copending U.S. application Serial No. 133,104 wherein high speed mis-timing is compensated so as to provide the necessary proper scavenging at this time. However, at the outset, it should be noted that the compensation, or modification, for the mis-timing at high speeds upsets the timing of the pressure exchanger for low speeds, not withstanding the addition of pockets in the hot and cold stator as set forth in the aforementioned copending U.S. application Serial No. 133,104. Thus high speed compensation of my present invention leads to wave a pattern which is different at low speeds from the low speed wave pattern normally obtained in a cycle having only hot and cold stator pocket combinations as set forth in aforementioned U.S. application Serial No. 133,104. Therefore, further modifications must also be used for low speed operation whenever the modifications for high speed are used if it is desirable to have a wide speed range of operation.

For high speed compensation I have provided a novel arrangement whereby the angular distance between the trailing edge of the high pressure outlet port and the leading edge of the low pressure outlet port is equal to or slightly larger than the angular distance between the leading edge of the high pressure inlet port and the leading edge of high pressure outlet port. This modification reduces the undesirable back-flow at the low pressure outlet port during high speed operation and permits proper scavenging during this high speed operation. As above noted, this results in the upsetting of the timing of the waves during low speed operation, a further modification is made by making the high pressure inlet port and the high pressure outlet port of substantially smaller angular width about the rotor so that there will be a minimum of back-flow and a maximum of scavenging during low pressure operation.

That is, the high speed compensation results in a larger cold stator pocket which would reduce the pocket pressure. However, a minimum pocket pressure is necessary to be effective for proper scavenging. Therefore, by reducing the size of the high pressure inlet and outlet port, the gas pressure is increased with a resultant increase in the magnitude of the shock wave feeding the cold stator pocket to thereby ensure proper scavenging.

The specific configuration of my invention provides for a pocket in both the cold and hot stator plate located between the trailing edges of the high pressure ports and the leading edges of the low pressure ports and has the leading and trailing edges of the high and low pressure inlet and outlet ports arranged as follows:

(a) The leading (opening) edge of the high pressure outlet port is related to the leading edge of the high pressure inlet port so that the compression acceleration wave created by the opening of the high pressure inlet port will arrive at the opposite end of the rotor at the same time the leading edge of the high pressure outlet port arrives at the same point when the pressure exchanger is being operated at design speed;

(b) The trailing (closing) edge of the high pressure inlet port is positioned with respect to the leading edge of the high pressure outlet port so that a reflected wave resulting from the opening of the high pressure outlet port arrives at a point at the opposite end of the rotor at the same time that the trailing edge of the high pressure inlet port arrives at the same point when the wave machine is operating below design speed. This arrangement, as will hereinafter be more apparent, has the net effect of reducing the circumferential or angular width of the high and low pressure inlet ports and, therefore, provides the necessary compensation for mis-timing during low speed operation;

(c) The trailing edge of the high pressure outlet port is related to the trailing edge of the high pressure inlet port so that the expansion deceleration wave created by the closing of the high pressure inlet port will reach a point at the opposite end of the rotor at the same time that the trailing edge of the high pressure outlet port reaches the same point in the rotor when the machine is being operated at design speed;

(d) The leading edge of the low pressure outlet port is circumferentially (angularly) spaced and related to the trailing edge of the high pressure outlet port so that the distance between is at least equal to or larger than the circumferential (angular) distance between the leading edge of the high pressure inlet port and the leading edge of the high pressure outlet port. This arrangement is the essence of my instant invention and provides for the necessary compensation for high speed operation to minimize back-flow and thereby provide sufficient scavenging;

(e) The leading edge of the low pressure inlet port is related to the leading edge of the low pressure outlet port so that an expansion acceleration wave created by the opening of the low pressure outlet port will reach an opposite end of the rotor at or above design speed at the same time that the leading edge of the low pressure inlet port reaches the same point in the rotor.

(f) Pockets are located in the stator plates between the trailing edges of the high pressure ports and the leading edges of the low pressure ports.

The net result of the very special relationship of the various leading and trailing edges of the high pressure and low pressure inlet and outlet ports is to extend the circumferential or angular length of the hot stator plate between the trailing edge of the high pressure inlet port and the leading edge of the low pressure outlet port. Thus, in a modification of my invention, the standard configuration set forth in the aforementioned copending U.S. application Serial No. 133,104 could be used but adding thereto a blocking means which can be selectively positioned in the low pressure outlet port to effectively increase the length of the cold stator plate between the high pressure inlet port and the low pressure outlet port.

Accordingly, a primary object of my invention is to provide a pressure exchanger with a novel port configuration whereby the maximum scavenging will be achieved during operations below, at and above design speed.

Another object of my invention is to provide a novel arrangement whereby the blocking means between the high pressure inlet port and low pressure outlet port is extended to provide the necessary compensation in a variable speed rotor for operations above design speed.

Another object of my invention is to provide the aforementioned feature in conjunction with an arrangement whereby the high pressure inlet and outlet ports are reduced in their circumferential or angular width to provide for the compensation needed to reduce back-flow and thereby increase scavenging during low speed operation.

Still another object of my invention is to provide a novel construction of an aero-dynamic wave machine which takes advantage of all of the features set forth in aforementioned copending U.S. application, Serial No. 133,104 and further provides for the necessary re-timing of the waves to insure proper scavenging during operations of the wave machine above design speed.

These and other objects of my invention will be apparent from the following description when taken in connection with the drawings in which:

FIGURE 1a is a flow diagram of a conventional wave machine operated at design speed under full load conditions.

FIGURE 1b is an energy diagram showing the pressure and speed of the wave machine of FIGURE 1a operated under the conditions indicated.

FIGURE 2a is a flow diagram of a wave machine operated at design speed having a pocket in the cold stator plate illustrating one feature of aforementioned copending U.S. application Serial No. 133,104.

FIGURE 2b is an energy diagram showing the pressure and speed of the wave machine of FIGURE 2a operated under the conditions indicated.

FIGURE 3a is a flow diagram of another embodiment of wave machine operated at design speed having a pocket in both the cold and hot stator plate illustrating another feature of aforementioned copending U.S. application Serial No. 133,104.

FIGURE 3b is an energy diagram showing the pressure and speed of the wave machine of FIGURE 3a operated under the conditions indicated.

FIGURE 4a is a flow diagram of the machine of FIGURE 3a and shows the wave pattern when the machine is operated above design speed.

FIGURE 4b is an energy diagram showing the pressure and speed of the wave machine of FIGURE 4a operated under the conditions indicated.

FIGURE 5a is a flow diagram of the machine of FIGURE 4a but shows the addition of my selective blocking device.

FIGURE 5b is an energy diagram showing the pressure and speed of the wave machine of FIGURE 5a operated under the conditions indicated.

FIGURE 6a is a flow diagram of a wave machine incorporating all of the novel features of my invention.

FIGURE 6b is an energy diagram showing the pressure and speed of the wave machine of FIGURE 6a operated under the conditions indicated.

FIGURE 7a is a flow diagram of a conventional porting arrangement similar to FIGURE 1a and shows the operation at low speed.

FIGURE 7b is an energy diagram showing the pressure and speed of the wave machine of FIGURE 7a operated under the conditions indicated.

FIGURE 8a is similar to FIGURE 7a but operated at design speed.

FIGURE 8b is an energy diagram showing the pressure and speed of the wave machine of FIGURE 8a operated under the conditions indicated.

FIGURE 9a is similar to FIGURES 7a and 8a but operated at high speed.

FIGURE 9b is an energy diagram showing the pressure and speed of the wave machine of FIGURE 9a operated under the conditions indicated.

FIGURE 10a is a flow diagram of a porting arrangement siimlar to that illustrated in FIGURES 3a and 4a and shows the operation at below design speed.

FIGURE 11a is a flow diagram similar to FIGURE 10a but shows the operation at design speed.

FIGURE 12a is a flow diagram similar to FIGURES 10a and 11a but shows the operation at high speed.

FIGURE 13a is a flow diagram of a wave machine with all of the novel fetaures of my instant invention when the machine is operated at low speed.

FIGURE 14a is a flow diagram similar to FIGURE 13a when the machine is operated at design speed.

FIGURE 15a is a flow diagram similar to FIGURES 13a and 14a and shows the conditions when the machine is operated at above design speed.

Figure 12B:
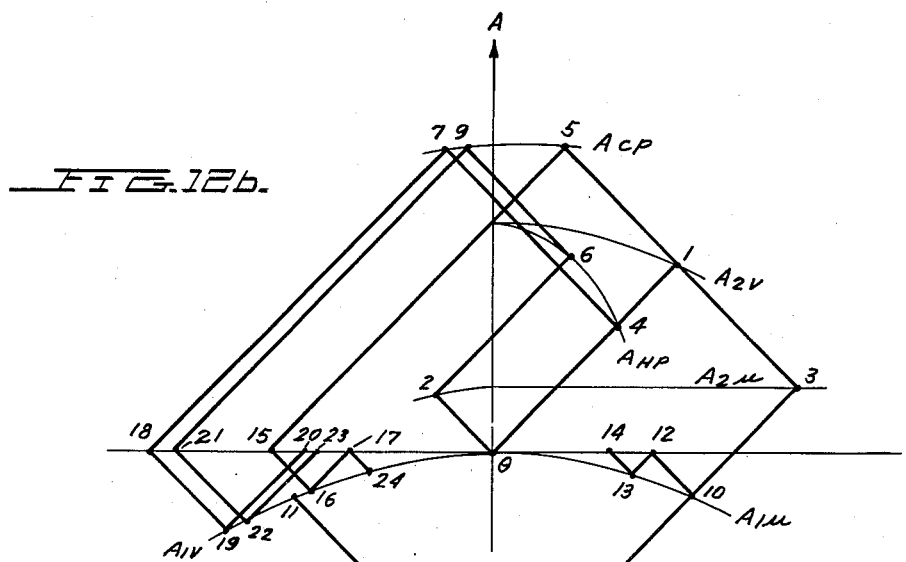
FIGURE 12b is an energy diagram showing the pressure and speed of the wave machine of FIGURE 12a operated under the conditions indicated.

In many applications, where a pressure exchanger is used as a supercharger for a reciprocating engine, the reciprocating engine will operate over a large speed range, as for example, from 500 to 2,500 r.p.m. In order to avoid the necessity of providing a separate prime mover from the pressure exchanger and also for the purposes of mechanical simplicity, it is desirable to drive the pressure exchanger directly from the reciprocating engine by way of a fixed ratio drive means from the crankshaft of the reciprocating engine. Thus, in such situations, the pressure exchanger will operate over the same general speed range as the reciprocating engine. The use of a pressure exchanger supercharger and reciprocating engine is illustrated and described in the aforementioned U.S. Patents 2,853,987 and 2,957,304.

When the pressure exchanger is used as a supercharger, it must have wide speed range and wide load range operation. When the pressure exchanger is connected to the reciprocating engine by a fixed ratio drive, the speed thereof is, of course, proportional to the engine speed so that the speed range of the pressure exchanger is variable. However, most pressure exchangers have to be designed for a specific design speed and any variation of that speed from the design speed as heretofore mentioned will result in the mis-timing of waves, thereby causing a back-flow at the low pressure outlet port.

Not only must the pressure exchanger be able to operate under variable speeds with a minimum of back-flow and maximum scavenging, but also it must operate under various gas and air pressures, that is, under a large range of different loads. Thus, the pressure exchanger has its wave pattern determined by not only the variations in speeds, but also the pressure differences between the driving (gas) and driven (air) medium. Hence, a pressure exchanger designed for the specific operating condition of having the gas pressure larger than the air pressure may not necessarily work if the gas pressure drops below the air pressure or, in other words, if the pressure differential between the high pressure air and the high pressure gas becomes negative. This negative pressure differential will, of course, affect the wave pattern such that back-flow of the low pressure outlet port will occur thereby interfering with the necessary scavenging of the device. Thus, in either case, that is, with rotor speed deviations from the design speed or if the difference between the air pressure and the gas pressure on the high pressure side becomes negative, an insufficient scavenging of a conventional pressure exchanger will result. Thus, when the pressure exchanger is used as a supercharger for a reciprocating engine, such as a diesel engine, and with a fixed ratio drive or clutch, a negative pressure difference may be caused by the mis-timing on the high pressure side whenever the rotor speed deviates from design speed and also at low gas pressures which occurs at low engine loads, such as idling. Thus, the scavenging requirements of the pressure exchanger primarily establish the limits for speed as well as load range of the wave machine. However, with my novel device, I have modified the porting arrangements so as to increase the scavenging ability of the machine to thereby extend its speed and load range.

In FIGURE 1, I have shown the wave diagram for a pressure exchanger in which the rotor 30 is rotated with respect to the cold and hot stator plates 40, 41 at design speed and, therefore, operating under optimum conditions. A more detailed description of the optimum operating conditions of a pressure exchanger is illustrated in the aforementioned U.S. Patents 2,867,981, 2,957,304, 2,959,344 and 2,970,745.

For the proper operation of a pressure exchanger as a supercharger for a reciprocating engine it is desirable that no contaminated hot gasses enter the pick-up or high pressure outlet port D. That is, the high pressure interface HPI should not reach into the high pressure outlet port D and, furthermore, the low pressure interface LPI should leave the rotor 30 before or at least at the closing of the low pressure outlet port A. That is, the high pressure interface (HPI) created at the leading edge 95 of the high pressure inlet port C should arrive at a point on the left or cold side of the rotor 30 after that point on the rotor has passed the trailing edge 97 of high pressure outlet port D and the low pressure interface (LPI) should terminate at a point on the right or hot side of the rotor 30 before that point on the right or hot side of the rotor 30 before that point on the rotor passes the trailing edge 93 of the low pressure outlet port A. That is, the high pressure interface (HPI) created at the leading edge 95 of the high pressure inlet port C should never arrive at a point on the rotor before that point has passed the trailing edge 97 of the high pressure outlet port D and the low pressure interface (LPI) should always arrive at a point on the rotor before that point has passed the trailing edge 93 of the low pressure outlet port A.

In general, the pressure in the field 2 will be somewhat higher than in the field 1. That is, the wave created at the leading edge 96 of the high pressure outlet port D will be a compression deceleration wave and identified by the numeral 66. Thus, if the wave 66 is a compression wave, the flow speed in the rotor 30 will be reduced as shown by the change in the high pressure interface between HPI and HPI'. That is, as the high pressure interface (HPI) crosses the wave 66, the flow speed in the rotor 30 will be reduced. The compression wave 66 will result in an increase of the pressure so that the pressure in field 2 will be greater than the one in field 1. On the other hand, if the wave 66 is an expansion acceleration wave, the flow speed will be increased.

The decrease or increase in flow speed in the field 2 in reference to the flow speed in the field 1 affects scavenging on the low pressure side. In the first case the pressure in the field 3 (FIGURE 1) is positive, and in the second case, the pressure in the field 3 (FIGURE 2) becomes negative.

The portion of the rotor located between the high pressure inlet port C and the high pressure outlet port D indicated by the field 1 and 2, is generally referred to as the high pressure zone of the rotor 30. The low pressure zone 4 is in that portion of the rotor 30 located between the low pressure inlet port B and the low pressure outlet port A. The higher the flow speed in the field 4, the earlier the interface LPI will reach the hot stator 41 at the low pressure port A.

It is essential to provide complete scavenging of the machine through the low pressure outlet port A. That is, the low pressure interface (LPI) must reach a point at the right-hand end of the rotor 30 before that point on the rotor 30 reaches the trailing edge 93. If this sequence does not exist the gases in the field 4 will be trapped in the rotor 30 and may subsequently be discharged through the high pressure outlet port D. Although this effect is substantially minimized by the reverse cycle illustrated in FIGURE 1, it is nevertheless a condition to be avoided when possible.

In order to avoid incomplete low pressure scavenging, a predetermined minimum amount of flow speed in the field 4 is required. The flow speed in the low pressure zone 4 depends on the pressure existing in the field 3 in the sense that the higher the pressure in the field 3, the higher will be the flow speed in the field 4. However, the pressure in the field 3 depends on the condition (pressure and velocity) existing in field 2.

It, therefore, becomes clear that the level of pressure in the field 3, determines the degree of low pressure scavenging through the low pressure outlet port A since the higher the pressure in the field 3, the earlier the low pressure interface LPI will reach the low pressure outlet port A. To put this another way, the higher the flow speed demands of the reciprocating engine being supplied with compressed air through the high pressure outlet port D, the lower will be the pressure in the field 2, and as a consequence also in field 3, thereby subsequently resulting in a reduction of the flow speed in the field 4 and possible incomplete low pressure scavenging.

In the illustration of FIGURE 1, there is shown basically the complete low pressure scavenging between the leading edge 91 and the trailing edge 93 of the low pressure outlet port A.

As mentioned in the introduction of the instant application, the scavenging of a conventional pressure exchanger is adversely affected as the rotor speed deviates from design speed and also if the pressure difference between the air and the gas pressure on the high pressure side becomes negative. Thus, the scavenging ability of the machine for various speeds above and below design speed and for various pressure differentials will result in the limitations of the speed and load range operation of the wave machine. In FIGURE 1 there is shown a conventional wave machine where the speed range is approximately 50%. In this instance, the speed range is defined as $[(N_{max}-N_{min}) \div N_{max}] \times 100\%$, where the $N_{max}$ is equal to the greatest possible rotor speed and the $N_{min}$ is equal to the smallest possible rotor speed. Also, in the conventional device of FIGURE 1, the scavenging became insufficient when the pressure differential approached zero where the pressure differential $\Delta P_2$ is equal to the difference between the air and gas pressure on the high pressure side, namely, the difference in the air and gas pressure at the high pressure outlet port D and high pressure inlet port C.

By introducing a pocket 70 in the cold stator 40, as illustrated in FIGURE 2a, it is possible to increase the speed range from 50 to 70%. However, there is no notable extension of the load range when the wave machine is modified with the cold stator pocket 70. Specifically, with negative $\Delta P_2$, the cold stator pocket 70, by itself, has no affect on the load range. The details of the function and purpose of the cold stator pocket 70 are described and claimed in aforementioned copending U.S. application Serial No. 133,104.

A further modification is set forth in the aforementioned application, Serial No. 133,104 whereby there is the utilization of not only a cold stator pocket 70 but also a hot stator pocket 90 as illustrated in FIGURE 3a. In this arrangement, the scavenging operation, when the gas pressure is low, that is at negative $\Delta P_2$, becomes partially possible. However, at very low, but specially at high speeds (with respect to the design speed) and in particular with a speed range of the engine at approximately 76%, the pressure exchanger would deliver contaminated gas as a result of the back-flow and resultant improper scavenging.

The basic problem regarding the incomplete scavenging of the pressure exchanger for low gas pressures at low speeds is best explained as follows: If the rotor speed decreases, the pressure differential $\Delta P_2$ becomes increasingly negative due to mis-timing. Thus, on the low pressure side, the back-flow fields make scavenging insufficient. These partial back-flow fields can be minimized or eliminated if the stagnation pressure in the cold stator pocket 70 does not drop under a critical level. However, the hot stator pocket 90 will maintain this critical pressure by sending a shock wave into the cold stator pocket 70. Unfortunately, however, at low load and low speed, the pressure of the exhaust gases from the reciprocating diesel engine (supplied to nozzle C) is too small in order to have any desirable effect even with the cold stator pocket 70. Thus, a negative pressure differential has an extremely undesirable effect at low speeds and low loads and the machine will not be properly scavenged.

The basic problem in connection with the pressure exchanger when operating under low gas pressure at high speeds is as follows: when the rotor speed is greater than the design speed, mis-timing takes place and thereby reduces the $\Delta P_2$. The wave pattern is illustrated in FIGURE 4a wherein it is seen that the air at the high pressure outlet port D and out-flow field 2 exists with high particle velocity. However, field 2 causes a back-flow 55 in the low pressure outlet port A at field 3. This back-flow 55 at field 3 continues to repeat throughout the entire scavenging period and if its intensity becomes strong enough, a complete flow reversal on the low pressure side of the pressure exchanger may result. Thus, there is again incomplete scavenging at high speeds for negative pressure differentials $[-\Delta P_2]$.

As noted, at high rotor speeds there is a strong back-flow 55 at field 3, as seen in FIGURE 4a, to impede the scavenging. If the velocity of the gas at field 3 could be reversed, proper scavenging might be realized. An approach of the instant invention is to provide an arrangement whereby the back-flow 55 at field 3 is stopped and/or converted into an in-flow field so that the exhaust energy of the pressure exchanger is directed in the proper direction, namely to scavenge the wave machine.

In principle, the problem can be solved by providing a block in a portion of the low pressure outlet port A to block off the field 3. This is best illustrated in FIGURE 5a wherein the block 80 is mounted from pivot 81 and is movable between the dotted and solid positions indicated. Thus, an expansion acceleration wave EA will be reflected by the block 80 at the closed end and the new boundary conditions convert the back-flow 55 of FIGURE 4a into a desirable in-flow 57, as seen in FIGURE 5a. Unfortunately, the blocking means 80, wider in angular width than the width of channel 35, would have a bad influence at low rotor speeds. However, as will hereinafter be more fully explained, a compromise of the block width, which would improve the high speed performance, can be found without remarkably disturbing the low speed conditions. It is also noted that a more refined solution to the problem would be to provide the block member 80 as a flap pivotally mounted at 81 to be gradually controlled to the open and closed position as the rotor speed exceeds design speed.

In FIGURE 6a I have shown my novel configuration wherein the high pressure inlet port C and high pressure outlet port D are substantially reduced in angular width and there is a special arrangement and relationship between the trailing edge 97' of the high pressure outlet port D to the leading edge 91' of the low pressure outlet port A. This arrangement also results in an enlargement of the block in the stator plates 40, 41 between the ports C—A and D—B as can readily be seen by comparison between FIGURES 5a and 6a. Hence, the back-flow 55 at field 3 in FIGURE 4a is now converted into an in-flow 58 at field 6 in FIGURE 6a. Thus, a compromise is reached in that only a half of the field 3 is cut off, as seen in FIGURE 6a, rather than the entire field, as seen in FIGURE 5a. Thus, although there is some back-flow at 60, the substantial increase of the in-flow 58 at field 6 more than offsets the undesirable back-flow 60 and thus it is not necessary to eliminate the entire field 3. There is a significant reason to keep the block between the ports C and A narrow because at full load and high speed a certain port difference indicated by the letter c in FIGURE 6a should be maintained. Therefore, a wide block between ports C and A would lead to a wide cold stator pocket 70. It has been found by theoretical investigations and by tests that if the cold stator pocket 70 is too long in circumferential length, it will have little effect because the pocket pressure therein drops below the critical level. In order to have good scavenging at speeds above design speeds and with a negative $\Delta P_2$, it is essential that the length e has to be substantially equal to or slightly greater than the length a as seen in FIGURE 6a. That is, the predetermined angular distance a between the leading edge 95 of the high pressure inlet port C and the leading edge 96 of the high pressure outlet port D is substantially equal or less than the angular length e between the trailing edge 97' of the high pressure outlet port D and the leading edge 91' of the low pressure outlet port A. This arrangement provides the necessary solution for high speed operation, i.e., $e \geq a$.

For a low speed operation, the openings of the ports C and D, that is the circumferential or angular width (not the radial width) is substantially reduced. It should be noted that the reduction of the circumferential width has a very definite influence on the wave pattern whereas a reduction in the radial height does not change the pattern. Thus, with substantially reduced openings of the ports C and D such that at the lowest speed enough gas pressure is built up in order to feed the pockets 70 and 90. Thus, the low speed is compensated for by providing a substantial reduction in the angular width of the ports C and D and this is achieved by having the relationship between the leading edge 96 and the trailing edge 98' such that the wave created at the leading edge 96 arrives at a point at the right of the rotor at the same time that point arrives at the trailing edge 98' when the wave machine is operated below design speed.

For a speed range of 76%, with which most of the reciprocating diesel engines for truck applications are equipped, the heretofore described cycles will achieve proper scavenging for any load. The cycle consists of the special layout of the high pressure ports to improve low speed performance and a special layout consisting of the port difference $e$ where the distance $e$ is substantially equal to or greater than the distance $a$ to thereby result in proper scavenging at high speed operation even when $\Delta P_2$ is negative. At full load, this cycle works the same way as the conventional one and only the smaller portings C and D give a somewhat higher gas and air pressure and, therefore, the air temperature will be slightly higher. However, when the speed range is far above 76%, the special layout resulting from the specific configuration in considering the dimension $e$ in relation to $a$ will no longer apply. For this speed range, the wave machine would have to be designed with a larger blocking member such as that illustrated in FIGURE 5a.

Thus, it is noted that poor scavenging of the pressure exchanger can result from either mis-timing of the waves, which results in undesirable back-flow, as well as restrictions in the system caused by mufflers, silencers, filters, etc., located in the low pressure system which would make scavenging difficult. The configuration described in connection with FIGURE 6a takes care of the problems resulting from mis-timing and works for some of the problems in connection with restrictions but has some limitations in connection therewith.

Thus, the net result of the proposed arrangement of our invention as set forth in FIGURE 6a permits the pressure exchanger to be operated not only over a wide speed range but also with a negative $\Delta P_2$. The experimentation has indicated that for supercharger applications, the pressure exchanger can operate with a fixed ratio drive within a speed range of approximately 76% under any gas pressures extending from idling conditions to full load conditions. It is believed that the instant invention is the first arrangement which has permitted an improved scavenging at speeds above design speeds without requiring the addition of other components, such as blowers, etc.

Figure 11B:
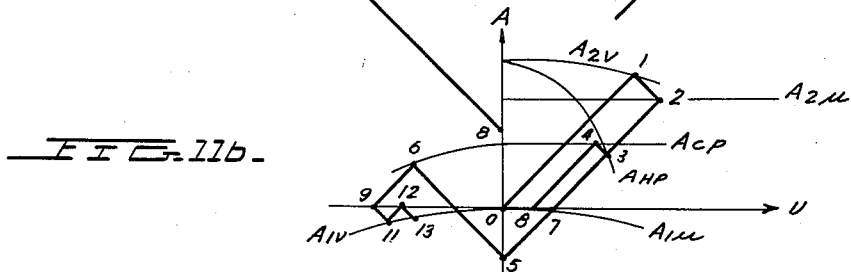
FIGURE 11b is an energy diagram showing the pressure and speed of the wave machine of FIGURE 11a operated under the conditions indicated.
Figure 10B:
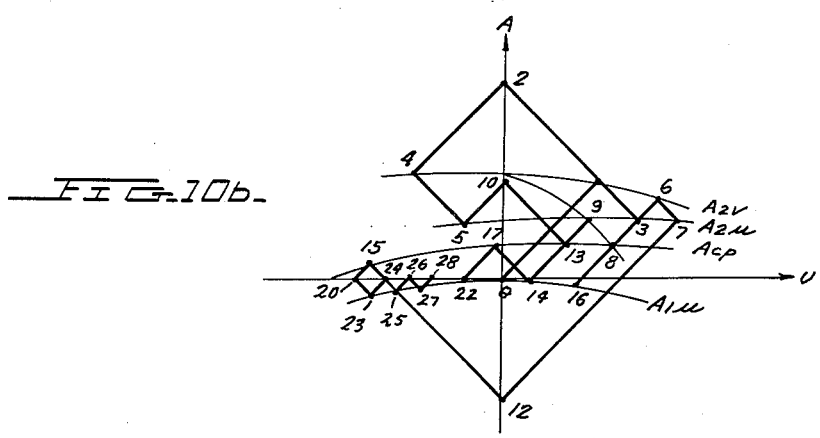
FIGURE 10b is an energy diagram showing the pressure and speed of the wave machine of FIGURE 10a operated under the conditions indicated.
Figure 15B:
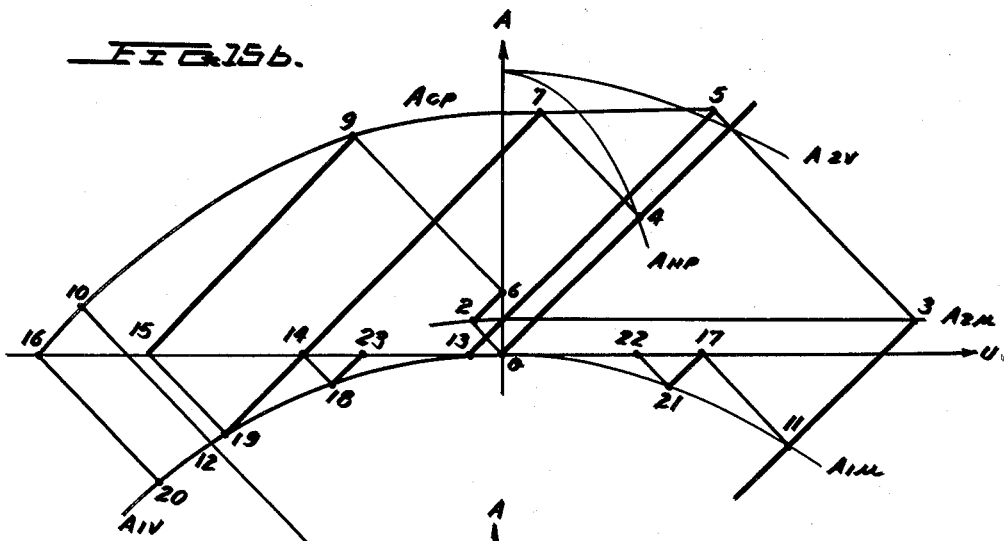
FIGURE 15b is an energy diagram showing the pressure and speed of the wave machine of FIGURE 15a operated under the conditions indicated.
Figure 14B:
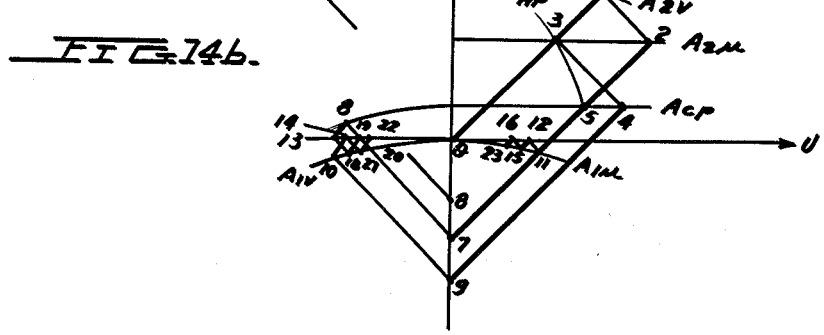
FIGURE 14b is an energy diagram showing the pressure and speed of the wave machine of FIGURE 14a operated under the conditions indicated.
Figure 13B:
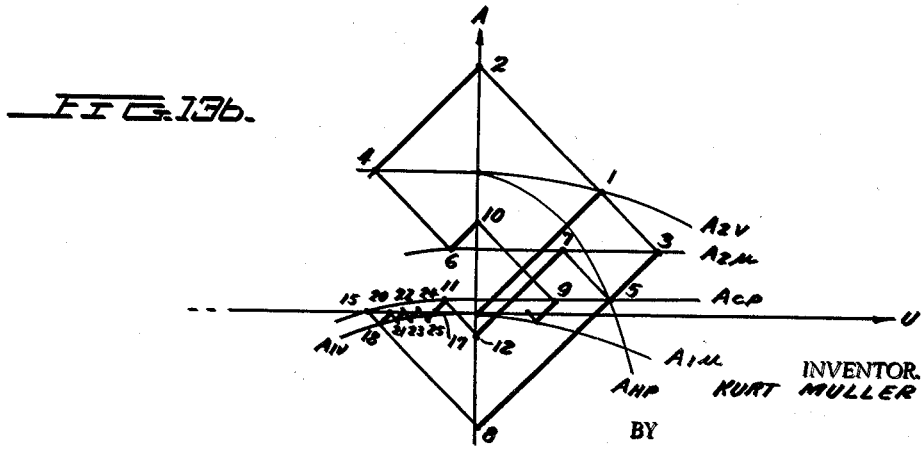
FIGURE 13b is an energy diagram showing the pressure and speed of the wave machine of FIGURE 13a operated under the conditions indicated.

In order to set forth the details and findings in connection with the instant invention, I have added FIGURES 7–15 which represent conventional type of porting in the series of FIGURES 7–9 and illustrate the modified porting of the aforementioned copending U.S. application Serial No. 133,104 in FIGURES 10–12 and illustrate the novel porting of the instant invention in FIGURES 13–15. For each porting arrangement there is illustrated in detail a flow diagram and an energy diagram that would exist for below design speed, design speed, and above design speed.

The wave diagrams have been simplified by the following assumptions:
(1) Both mediums have the same temperature.
(2) The temperature is a constant for all speeds.
(3) No leakage.
(4) The pressures in the intake and exhaust ports B and A are equal to the ambient pressure.

In general, it has been assumed that the rotor 30 has an infinite number of channels 35, except at the pocket boundaries, where a finite channel width is considered in order to show the proper effect of the pockets 70 and 90. These simplified wave diagrams show the relative effect rather than absolute results.

The following chart simplifies and summarizes the comparison of the three different cycles analyzed in FIGURES 7–15.

| Porting | Fig. | Rotor Speed | Scavenging |
|---|---|---|---|
| Conventional Portings. | 7<br>8<br>9 | Low Speed .67 N₀<br>Design Speed N₀<br>High Speed 1.4 N₀ | Backflow.[1]<br>No scavenging.<br>Do. |
| Conventional portings modified with the hot stator-cold stator pocket. | 10<br>11<br>12 | Low Speed .67 N₀<br>Design Speed N₀<br>High Speed 1.4 N₀ | Compared with Figs. 7 and 8, Scavenging is improved.<br>No scavenging. |
| New Portings | 13<br>14<br>15 | Low Speed .67 N₀<br>Design Speed .9 N₀<br>High Speed 1.4 N₀ | Only slight backflow, and all three cases indicate good scavenging. |

[1] In order to indicate the velocity of a particle the path of a particle which enters the rotor at the opening edge of the air intake port has been marked in the diagrams (dotted lines). For tracking a particle when it leaves the rotor, imagine longer fictitious channels.

Unsteady flow can be analyzed with the flow diagram identified by the letters ($a$) and the energy diagram identified by the letters ($b$). The flow diagram shows the compression and expansion waves and the path of a particle as a function of time. The energy diagram represents the condition of the medium such as its pressure and its speed. FIGURE 1a illustrates the flow diagram and FIGURE 1b would be the corresponding energy diagram.

It is convenient to plot the ratio $$A = \frac{a}{a_0}$$

instead of the absolute pressure, the ratio $$U = \frac{u}{a_0}$$

instead of the absolute velocity of the medium, where $a$ = sonic speed of the medium at its temperature,
$a_0$ = sonic speed of the medium referred to an arbitrary temperature (e.g. ambient temperature). (It is assumed that all changes in pressure are isentropic.)
$u$ = absolute velocity of a particle.

Isentropic pressure change $$\frac{P}{P_0} = \left(\frac{T}{T_0}\right)^{\frac{\alpha}{\alpha-1}}$$

Sonic speed of a gas $$a = \sqrt{g\alpha RT}$$

Ratio of the sonic speeds $$\frac{a}{a_0} = \left(\frac{P}{P_0}\right)^{\frac{\alpha-1}{2\alpha}}$$

and $$\frac{P}{P_0} = \left(\frac{T}{T_0}\right)^{\frac{\alpha}{\alpha-1}}$$

The correlation between the speed and the pressure is:

$$U_1 - U_2 = \frac{2}{\alpha} - 1(A_1 - A_2)$$

$p$ = pressure of the gas
$T$ = temperature of the gas
$g$ = earth acceleration
$R$ = gas constant
$\alpha$ = index of adiabatic compression or expansion; subscripts 1, 2 refer to states 1 and 2 respectively. The boundary pressure conditions are denoted as:
  $A_{2\nu}$ for the Nozzle HP inlet port C
  $A_{2\mu}$ for the Pickup HP outlet port D
  $A_{1\nu}$ for the intake LP inlet port B
  $A_{1\mu}$ for the exhaust LP outlet port A
  $A_{CP}$ for the Cold Stator Pocket 70
  $A_{HP}$ for the Hot Stator Pocket 90

Thus, in summary, my novel wave machine would be designed generally along the following sequence:
(a) As seen in FIGURE 4a, the leading edge 96 of the high pressure outlet port D is angularly related to the leading edge 95 of the high pressure inlet port C so that a compression acceleration wave CA created at the leading edge 95 will arrive at a point at the left of the rotor when that point is reached by the leading edge 96 when the wave machine is operated at approximately design speed. This determines the distance *a* as seen in FIGURE 6*a*.

(*b*) As seen in FIGURE 13*a*, the trailing edge 98' of the high pressure inlet port C is angularly positioned with respect to the leading edge 96 of the high pressure outlet port so that a reflected wave created at leading edge 96 will arrive a point on the right of the rotor when that point arrives at the trailing edge 98', when the wave machine is operated below design speed. This has the net effect of reducing the angular width of ports C and D to provide the necessary compensation for mis-timing during low speed operation.

(*c*) As seen in FIGURE 14*a*, the trailing edge 97' of the high pressure outlet port D is angularly related to the trailing edge 98' of the high pressure inlet port C so that the expansion deceleration wave ED created at the trailing edge 98' will reach a point at the left of the rotor when that point reaches the trailing edge 97' when the wave machine is operated at design speeds. This determines the distance *b* as seen in FIGURE 6*a*.

(*d*) As seen in FIGURE 6*a*, the leading edge 91' of the LP outlet port A is angularly related to the trailing edge 97' of the high pressure outlet port D so that this distance *e* is equal to or slightly greater than distance *a*. This arrangement is the essence of my instant invention and provides for the necessary compensation for high speed operation.

(*e*) As seen in FIGURE 14*a*, the leading edge 92' of the low pressure inlet port B is related to the leading edge 91' of the low pressure outlet port A so that an expansion acceleration wave EA created at the leading edge 91' will reach a point on the left of the rotor when that point reaches the leading edge 92' when the wave machine is operated at or above design speed.

(*f*) A cold stator pocket 70 and a hot stator pocket 90 are positioned in cold stator 40 and hot stator 41 in the manner described and claimed in connection with aforementioned copending application Serial No. 133,104.

I have provided a novel arrangement whereby a pressure exchanger, which may be used as a direct driven supercharger for a reciprocating engine, can have a substantially increased load and speed range by a modification of the porting arrangement. In particular, my novel pressure exchanger insures proper scavenging for pressure exchanger operation at speeds above and below design speed and, furthermore, provides for adequate and necessary scavenging when the pressure differential between air and gas pressures becomes negative. Basically, this is achieved by extending the length of the blocking means between the high pressure inlet port C and the low pressure outlet port A to render the necessary compensation for high speed operation and to reduce the angular width of high pressure inlet port C and outlet port D to make the necessary compensation for low speed operation.

Although it is recognized that my novel pressure exchanger has a greater speed and load range than the conventional one equipped with the cold-stator hot stator pocket 70, 90 combination (U.S. application Serial No. 133,104) but it does not replace that cycle for all uses of a supercharger. That is, the novel portings of my instant invention requires smaller high pressure openings than the conventional porting. Therefore the smaller openings C and D will result in higher pickup pressures and higher pickup temperatures. The selection of the cycle to be used depends on the requirements of the reciprocating engine to be supercharged by the pressure exchanger, such as the speed range, load range and maximum pickup temperature.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. A pressure exchanger comprising a rotor for receiving and discharging fluids, a first stator plate and a second stator plate; said fluids being supplied to said rotor from a high pressure inlet port and a low pressure inlet port; fluid being extracted from said rotor from a high pressure outlet port and a low pressure outlet port; said high pressure outlet port and said low pressure inlet port being located in said first stator plate on one side of said rotor; said high pressure inlet port and said low pressure outlet port being located in said second stator plate on the other side of said rotor; said rotor being rotatable with respect to said first and second stator plates; said high pressure inlet and outlet ports defining a high pressure zone of said rotor; said low pressure inlet and outlet ports defining a low pressure zone of said rotor; means located between said high pressure and low pressure zone in the direction of rotation of said rotor to increase the pressure in said rotor between said zones; said means being comprised of a first means located in said first stator plate and a second means located in said second stator plate; said second means comprising a gap in said second stator plate extending from said high pressure inlet port to an area in said rotor between said high pressure and low pressure zones in the direction of rotation of said rotor; said pressure exchanger being operatively constructed so that the angular distance between the trailing edge of said high pressure outlet port and the leading edge of said low pressure outlet port is at least as great as the angular distance between the leading edges of said high pressure inlet and outlet ports to thereby effectively increase the length of the second stator plate in the direction of rotation existing between said high pressure inlet port and said low pressure outlet port.

2. The pressure exchanger as defined in claim 1 wherein the leading edges of said high pressure ports and trailing edges of said high pressure ports, respectively, are operatively angularly positioned in said first and second stator plates with respect to each other to achieve optimum timing and scavenging during rotation of said rotor at design speeds; the trailing edge of said high pressure inlet port being operatively angularly positioned in said first and second stator plates with respect to said leading edge of said high pressure outlet port to achieve optimum timing and scavenging during rotation of said rotor at less than design speed; and the leading edges of the low pressure ports are operatively angularly positioned in said first and second stator plates with respect to each other to achieve optimum timing and scavenging during rotation of said rotor at and above design speeds.

3. A pressure exchanger comprised of a first and second stator plate and a rotor; said first and second stator plate being located on opposite sides of said rotor; said first stator plate having a high pressure outlet port and a low pressure inlet port; said second stator plate having a high pressure inlet port and a low pressure outlet port; each of said ports having a leading edge and a trailing edge; said rotor being rotatable past said ports; said ports being circumferentially spaced in the following sequence; leading edge of said high pressure inlet port, leading edge of said high pressure outlet port, leading edge of said low pressure outlet port, leading edge of said low pressure inlet port, trailing edge of said low pressure inlet port, trailing edge of said low pressure outlet port, a first means located in said first stator plate between said trailing edge of said high pressure outlet port and said leading edge of said low pressure inlet port to aid scavenging of fluid through said low pressure outlet port, a second means located in said second stator plate between said high pressure inlet port and said leading edge of said low pressure outlet port; said second means comprising a passageway from said high pressure inlet port to an area in said rotor opposite said first means; said leading edges of said high pressure ports, said leading edges of said low pressure ports and said trailing edges of said low pressure ports, respectively, being related to each in their angular position in said first and second stator plates about said rotor to result in optimum timing when said rotor is operated at design speeds; said leading edge of said low pressure outlet port being angularly spaced from said trailing edge of said high pressure outlet port by a distance at least as great as the angular distance between the leading edges of said high pressure inlet and outlet port to thereby improve scavenging during speeds of said rotor above said design speed.

4. The pressure exchanger of claim 3 in which said high pressure ports have an angular length which is required for optimum operation of rotor scavenging at design speed.

5. A pressure exchanger comprising a rotor for receiving and discharging fluids, a first stator plate and a second stator plate; said fluids being supplied to said rotor from a high pressure inlet port and a low pressure inlet port; fluid being extracted from said rotor from a high pressure outlet port and a low pressure outlet port; said high pressure outlet port and said low pressure inlet port being located in said first stator plate on one side of said rotor; said high pressure inlet port and said low pressure outlet port being located in said second stator plate on the other side of said rotor; each of said ports having a leading edge and a trailing edge; said rotor being rotatable with respect to said ports; said ports being circumferentially spaced with respect to said rotor in the following sequence; said leading edge of said high pressure inlet port; said leading edge of said high pressure outlet port; said trailing edge of said high pressure inlet port; said trailing edge of said high pressure outlet port, said leading edge of said low pressure outlet port, said leading edge of said low pressure inlet port; said trailing edge of said low pressure inlet port; said trailing edge of said low pressure outlet port; said high pressure inlet and outlet ports defining a high pressure zone of said rotor; said low pressure inlet and outlet ports defining a low pressure zone of said rotor; means located between said high pressure and low pressure zone to increase the pressure in said rotor between said zones; said means being a first pocket located in said first stator plate between said high pressure outlet port and said low pressure inlet port and a second pocket located in said second stator plate; said first and second pockets providing a passage for high pressure fluid to pass into an area adjacent said low pressure zone; said leading edge of said high pressure outlet port is located to be positioned at a first point on said rotor at the same time a compression wave generated at the leading edge of said high pressure inlet port terminates at said first point when said rotor is operated at design speeds; said trailing edge of said high pressure outlet port being angularly positioned relative to the trailing edge of said high pressure inlet port so that said trailing edge of said high pressure outlet port is located to be positioned at a second point on said rotor at the same time an expansion wave generated at the trailing edge of said high pressure inlet port terminates at said second point when said rotor is operated at design speed; said leading edge of said low pressure outlet port being angularly spaced in the direction of rotation relative to the trailing edge of said high pressure outlet port a distance at least as great as the angular spacing between the leading edges of said high pressure inlet and outlet ports.

6. The pressure exchanger as defined in claim 5 in which said high pressure ports have an angular length which is required for optimum operation of rotor scavenging at design speed.

7. The pressure exchanger as defined in claim 5 whereby the trailing edge of said high pressure inlet port is angularly positioned relative to the leading edge of said high pressure outlet port so that said trailing edge of said high pressure inlet port is located to be positioned at a third point on said rotor at the same time a reflected wave generated by the leading edge of said high pressure outlet port terminates at said third point when said rotor is operated at below design speed.

8. A pressure exchanger comprising a rotor for receiving and discharging fluids, said fluids being supplied to said rotor from a high pressure inlet port and a low pressure inlet port; fluid being extracted from said rotor from a high pressure outlet port and a low pressure outlet port; said high pressure outlet port and said low pressure inlet port being located in a first stator plate on one side of said rotor; said high pressure inlet port and said low pressure outlet port being located in a second stator plate on the other side of said rotor; said rotor being rotatable with respect to said first and second stator plates; said high pressure inlet and outlet ports defining a high pressure zone of said rotor; said low pressure inlet and outlet ports defining a low pressure zone of said rotor; means located between said high pressure and low pressure zone in the direction of rotation of said rotor to increase the pressure in said rotor between said zones; said means being comprised of a first means located in said first stator plate and a second means located in said second stator plate; said second means comprising a gap in said second stator plate extending from said high pressure inlet port to an area in said rotor between said high pressure and low pressure zones in the direction of rotation of said rotor, said first and second means also including a pocket located in said first and second stator plates respectively; the leading edges of said high pressure ports, the leading edges of said low pressure ports and the trailing edges of said low pressure ports respectively being relatively angularly positioned whereby said pressure exchanger operates at optimum timing for design rotor speeds; third means to effectively extend the leading edge of said low pressure outlet port to minimize back-flow into said pressure exchanger when said rotor is operated above design speed; said third means being an adjustable flap to selectively block a portion of the angular length of said low pressure outlet port.

References Cited in the file of this patent

UNITED STATES PATENTS

| | | |
|---|---|---|
| 2,852,915 | Jendrassik | Sept. 23, 1958 |
| 2,904,244 | Pearson | Sept. 15, 1959 |
| 3,011,487 | Berchtold | Dec. 5, 1961 |
| 3,012,708 | Berchtold | Dec. 12, 1961 |

UNITED STATES PATENT OFFICE
CERTIFICATE OF CORRECTION

Patent No. 3,120,339 February 4, 1964

Kurt Muller

It is hereby certified that error appears in the above numbered patent requiring correction and that the said Letters Patent should read as corrected below.

In the drawing, Sheet 7, FIG. 14a, the numerals 91, 92 and 97 should have a prime added thereto, each occurrence; column 1, line 68, for "to wave a pattern" read -- to a wave pattern --; column 4, line 69, for "from" read -- for --; column 5, lines 24 to 26, strike out "of having the gas pressure larger than the air pressure may not necessarily work if the gas pressure drops below the air pressure" and insert instead -- of having the air pressure larger than the gas pressure may not necessarily work if the air pressure drops below the gas pressure --; column 10, line 58, the equation should appear as shown below instead of as in the patent:

$$U_1 - U_2 = \frac{2}{\alpha - 1}(A_1 - A_2)$$

Signed and sealed this 11th day of August 1964.

(SEAL)
Attest:

ERNEST W. SWIDER EDWARD J. BRENNER

Attesting Officer Commissioner of Patents